United States Patent
Sippel et al.

(10) Patent No.: US 11,156,111 B2
(45) Date of Patent: Oct. 26, 2021

(54) PINNED PLATFORM FOR BLADE WITH CIRCUMFERENTIAL ATTACHMENT

(71) Applicants: Rolls-Royce Corporation, Indianapolis, IN (US); Rolls-Royce North American Technologies Inc., Indianapolis, IN (US)

(72) Inventors: Aaron D. Sippel, Zionsville, IN (US); Ted J. Freeman, Danville, IN (US); Loic Fabries, West Lafayette, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 153 days.

(21) Appl. No.: 16/119,504

(22) Filed: Aug. 31, 2018

(65) Prior Publication Data

US 2020/0072063 A1  Mar. 5, 2020

(51) Int. Cl.
*F01D 5/30* (2006.01)

(52) U.S. Cl.
CPC ...... *F01D 5/3069* (2013.01); *F05D 2220/323* (2013.01); *F05D 2230/60* (2013.01); *F05D 2240/20* (2013.01); *F05D 2240/80* (2013.01)

(58) Field of Classification Search
CPC .......... F01D 5/3069; F01D 5/30; F01D 5/066; F01D 5/3053; F05D 2240/80
See application file for complete search history.

(56) References Cited

U.S. PATENT DOCUMENTS

| | | | |
|---|---|---|---|
| 2,727,716 A * | 12/1955 | Feilden | F01D 5/3023 416/134 R |
| 2,757,900 A * | 8/1956 | Hersey | F01D 5/30 416/215 |
| 4,094,615 A | 6/1978 | Glenn | |
| 4,102,603 A * | 7/1978 | Smith | F01D 5/021 416/229 A |
| 4,280,795 A | 7/1981 | Trousdell | |
| 6,457,942 B1 | 10/2002 | Forrester | |
| 7,284,958 B2 | 10/2007 | Dundas et al. | |
| 7,972,113 B1 | 7/2011 | Davies | |
| 8,608,446 B2 | 12/2013 | Pickens et al. | |
| 8,651,820 B2 | 2/2014 | Krikunov et al. | |
| 8,662,826 B2 | 3/2014 | Willett, Jr. et al. | |
| 8,727,730 B2 | 5/2014 | Liotta et al. | |
| 8,840,374 B2 | 9/2014 | Garcia-Crespo et al. | |
| 8,894,372 B2 | 11/2014 | Willett, Jr. et al. | |
| 8,905,716 B2 | 12/2014 | Boyington | |
| 9,057,278 B2 | 6/2015 | Howes et al. | |
| 9,328,622 B2 | 5/2016 | Garcia-Crespo et al. | |
| 9,453,422 B2 | 9/2016 | Hile et al. | |
| 9,840,931 B2 | 12/2017 | Joshi et al. | |

(Continued)

*Primary Examiner* — Michael L Sehn
(74) *Attorney, Agent, or Firm* — Barnes & Thornburg LLP

(57) ABSTRACT

A wheel assembly for a gas turbine engine includes a disk, a plurality of blades, and a platform system that includes a plurality of platforms and pins. The disk is configured to rotate about an axis during operation of the gas turbine engine. The blades each include a circumferentially extending root received in the disk and an airfoil that extends radially away from the root. The platforms are arranged around the wheel to define a flow path of the gas turbine engine and the pins extend into the platforms and the disk to couple the platforms with the disk.

20 Claims, 8 Drawing Sheets

(56) References Cited

U.S. PATENT DOCUMENTS

| | | |
|---|---|---|
| 9,920,636 B2 | 3/2018 | Brandl |
| 2007/0014667 A1 | 1/2007 | Pickens |
| 2013/0149158 A1 | 6/2013 | Aiello et al. |
| 2016/0138407 A1* | 5/2016 | Freeman ................. F01D 5/284 |
| | | 416/214 A |
| 2016/0305260 A1 | 10/2016 | Freeman |
| 2018/0149026 A1 | 5/2018 | Vetters et al. |

* cited by examiner

PINNED PLATFORM FOR BLADE WITH CIRCUMFERENTIAL ATTACHMENT

FIELD OF THE DISCLOSURE

The present disclosure relates generally to gas turbine engines, and more specifically to wheel assemblies for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

To withstand heat from the combustion products received from the combustor, the turbine may include turbine wheels having blades that comprise composite materials adapted to interact with the hot combustion products. In some turbine wheels, the blades may be coupled to a disk that supports the blades in a gas path of the engine. Coupling the composite blades with disks, for example, metallic disks, can present design challenges.

SUMMARY

The present disclosure may comprise one or more of the following features and combinations thereof.

A wheel assembly for a gas turbine engine may include a multi-piece disk, a blade, and a platform system. The multi-piece disk may be adapted to rotate about an axis during use of the gas turbine engine. The multi-piece disk may include a fore-disk segment and an aft-disk segment located axially aft of the fore-disk segment to define a blade-receiver channel that extends circumferentially around the axis. The blade may be adapted to interact with gases during use of the gas turbine engine. The blade may include a root located in the blade-receiver channel and an airfoil that extends radially away from the root. The root may have a dovetail shaped portion when viewed circumferentially relative to the axis.

The platform system may include a platform and a first pin. The platform may be arranged partway around the blade to define a boundary of a flow path of the gases. The first pin may extend axially into the platform and into at least one of the fore-disk segment and the aft-disk segment to couple the platform with the multi-piece disk for rotation therewith. In some embodiments, the first pin may extend into the fore-disk segment, through the platform, and into the aft-disk segment.

In some embodiments, the fore-disk segment may be formed to include a fore blind hole that opens into the blade-receiver channel. The aft-disk segment may be formed to include an aft blind hole that opens into the blade-receiver channel. The first pin may extend into the fore blind hole, through the platform, and into the aft blind hole.

In some embodiments, the fore-disk segment may be formed to include a fore blind hole that opens into the blade-receiver channel. The aft-disk segment may be formed to include an aft thru-hole that extends axially through the aft-disk segment and opens into the blade-receiver channel. The first pin may extend into the fore blind hole, through a first portion of the platform, through the aft thru-hole, and into a second portion of the platform.

In some embodiments, the platform may include an outer radial wall, a fore wall that extends radially inward from the outer radial wall, and an aft wall that extends radially inward from the outer radial wall. The aft wall may be spaced apart axially from the fore wall to locate the multi-piece disk therebetween.

In some embodiments, the fore-disk segment may be formed to include a fore blind hole that extends axially aft into the fore-disk. The aft-disk segment may be formed to include an aft blind hole that extends axially forward into the aft-disk. The first pin may extend into the fore wall of the platform and into the fore blind hole. The platform system may include a second pin that extends into the aft wall of the platform and into the aft blind hole. In some embodiments, the first pin may be spaced apart circumferentially from the second pin.

In some embodiments, the fore-disk segment may be formed to include a fore thru-hole that extends axially through the fore-disk segment and opens into the blade-receiver channel. The aft-disk segment may be formed to include an aft thru-hole that extends axially through the aft-disk segment and opens into the blade-receiver channel. The first pin may extend into the fore wall of the platform, through the fore thru-hole, and through the aft thru-hole.

In some embodiments, the fore-disk segment may be formed to include a thru-hole that extends axially through the fore-disk segment and opens into the blade-receiver channel. The first pin may extend through the thru-hole and into the platform.

According to another aspect of the present disclosure, a wheel assembly includes a disk, a blade, and a platform system. The disk may be formed to define a blade-receiver channel that extends circumferentially around an axis. The blade may include a circumferentially extending root located in the blade-receiver channel and an airfoil that extends radially away from the root. The platform system may include a platform arranged partway around the airfoil of the blade and a pin. The pin may extend axially into the platform and into the disk to couple the platform with the disk for rotation with the disk.

In some embodiments, the disk may include a first band and a second band spaced apart axially from the first band to define a portion of the blade-receiver channel. The first band may be formed to include a thru-hole that extends axially through the first band and opens into the blade-receiver channel. The pin may extend through the thru-hole and into a blind hole formed in the platform.

In some embodiments, the disk may be formed to include a thru-hole that extends axially through the disk. The pin may extend through the disk and into the platform.

In some embodiments, the platform may include an outer radial wall, a first wall that extends radially inward from the outer radial wall, and a second wall that extends radially inward from the outer radial wall. The second wall may be spaced apart axially from the first wall to locate the disk therebetween.

In some embodiments, the disk may include a first band and a second band spaced apart axially from the first band to define a portion of the blade-receiver channel. The first band may be formed to include a first blind hole that extends axially into the first band. The second band may be formed to include a second blind hole that extends axially into the second band. The pin may extend into the first wall of the platform and into the first blind hole. The platform system may include another pin that extends into the second wall of the platform and into the second blind hole.

In some embodiments, the turbine wheel assembly may further include a cover plate configured to block axial movement of the pin. The cover plate may include a circumferentially extending body, a pin-retention flange that extends radially outward away from the body and overlaps the pin, and a lock tab that extends radially outward away from the body. The lock tab may be spaced apart axially from the pin-retention flange to locate the first wall of the platform therebetween.

In some embodiments, the disk may include a first-disk segment and a second-disk segment located axially adjacent the first-disk segment. The pin may extend into the first-disk segment, through the platform, and into the second-disk segment.

In some embodiments, the first-disk segment may be formed to include a first blind hole that opens into the blade-receiver channel. The second-disk segment may be formed to include a second blind hole that opens into the blade-receiver channel. The pin may extend into the first blind hole, through the platform, and into the second blind hole.

In some embodiments, the first-disk segment may be formed to include a blind hole that opens into the blade-receiver channel. The second-disk segment may be formed to include a thru-hole that extends axially through the second-disk segment and opens into the blade-receiver channel. The pin may extend into the blind hole, through the platform, and through the thru-hole.

In some embodiments, the platform may include an outer radial wall, a rib that extends radially inward away from the outer radial wall, and a support arm that extends radially inward away from the outer radial wall. The rib may be located in the blade-receiver channel. The support arm may be spaced apart axially from the rib to locate axially the second-disk segment between the rib and the support arm. A portion of the pin may be received in the support arm.

According to an aspect of the disclosure, a method includes a number of steps. The method may include providing a multi-piece disk having a first-disk segment and a second-disk segment, a blade that includes a root and an airfoil that extends radially away from the root relative to an axis, the root being dovetail shaped when viewed circumferentially relative to the axis, and a platform system that includes a platform and a pin, locating the root of the blade in a circumferentially extending passage formed in the first-disk segment, positioning the platform adjacent the first-disk segment, inserting the pin into the platform and the first-disk segment to couple the platform with the first-disk segment for movement therewith, moving the second-disk segment relative to the first-disk segment to locate the root of the blade in a circumferentially extending passage formed in the second-disk segment, and blocking relative movement between the first-disk segment and the second-disk segment.

These and other features of the present disclosure will become more apparent from the following description of the illustrative embodiments.

DETAILED DESCRIPTION OF THE DRAWINGS

Figure 1:
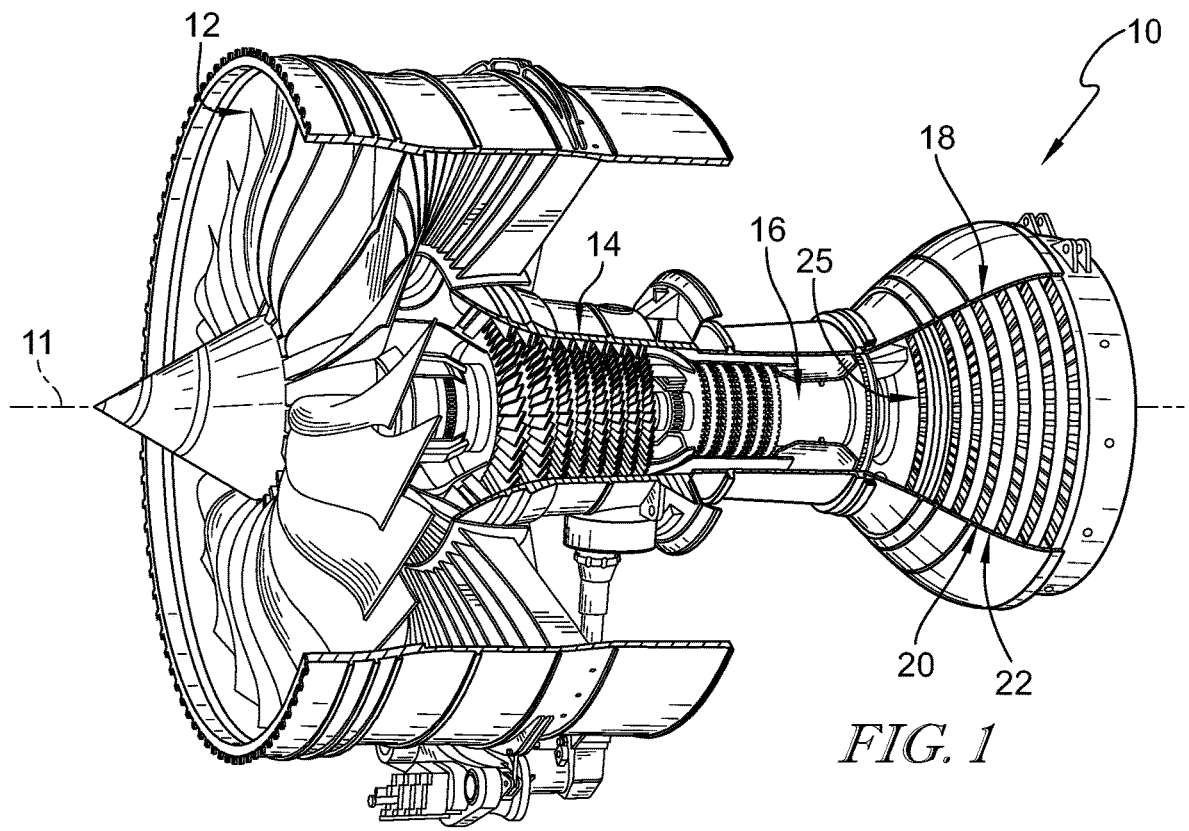
FIG. 1 is a cutaway view of a gas turbine engine that includes a fan, a compressor, a combustor, and a turbine that includes a plurality of turbine wheel assemblies in accordance with the present disclosure that are adapted to extract work from hot combustion products received from the combustor.

For the purposes of promoting an understanding of the principles of the disclosure, reference will now be made to a number of illustrative embodiments illustrated in the drawings and specific language will be used to describe the same.

Figure 2:
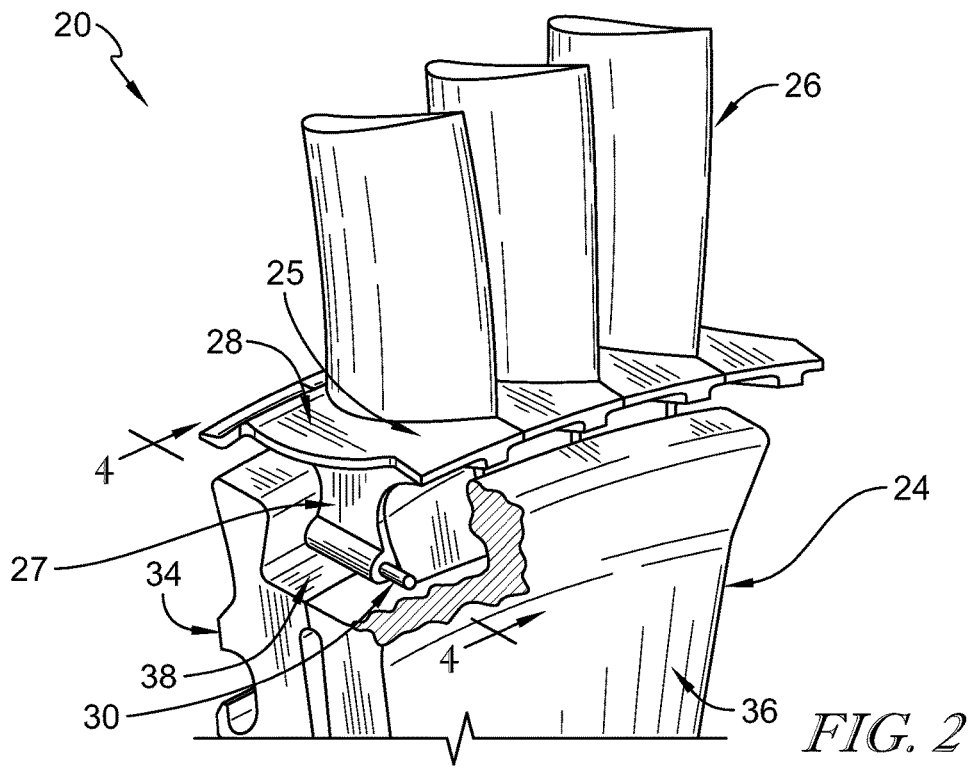
FIG. 2 is a perspective view of a portion of one of the turbine wheel assemblies included in the gas turbine engine of FIG. 1 showing that the turbine wheel assembly includes a multi-piece disk that defines a circumferentially extending channel, a plurality of blades having circumferentially extending roots located in the channel, and a platform system the includes a plurality of platforms located between the blades and a plurality of pins that couple the platforms with the multi-piece disk.

A wheel assembly 20 for adapted for use with a gas turbine engine 10 includes a disk 24, a plurality of blades 26, and a platform system 27 as shown in FIGS. 1 and 2. The disk 24 is adapted to retain the blades 26 and the platform system 27 and to rotate about a center axis 11 during operation of the gas turbine engine 10. The blades 26 each include a circumferentially extending root 60 received in the disk 24 and an airfoil 62 that extends radially away from the root 60 to interact with gases flowing through the gas turbine engine 10. The platform system 27 includes a plurality of platforms 28 that define a boundary of a gas path 25 of the gas turbine engine 10 and pins 30 that extend into the platforms 28 and the disk 24 to couple the platforms 28 with the disk 24.

Figure 3:
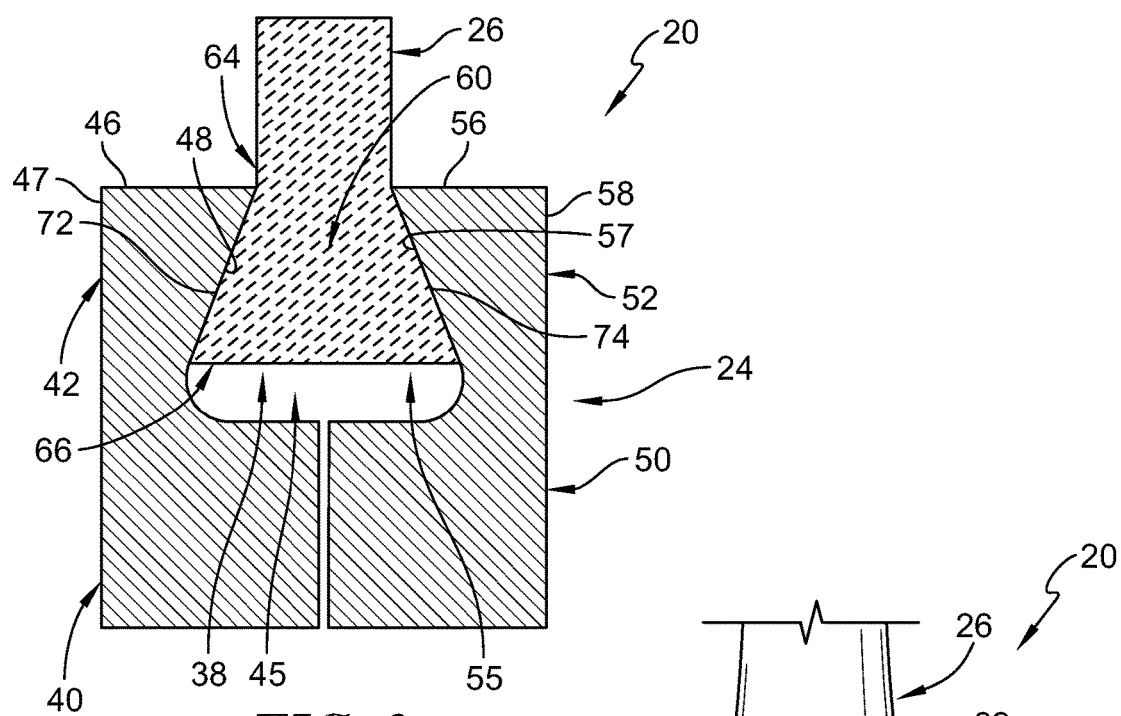
FIG. 3 is a diagrammatic and section view of the turbine wheel assembly of FIG. 2 showing that the multi-piece disk includes a fore-disk segment adjacent an aft-disk segment to define the channel therebetween and the circumferentially extending root of one of the blades located in the channel such that the blade is blocked from radial movement out of the channel.
Figure 7:
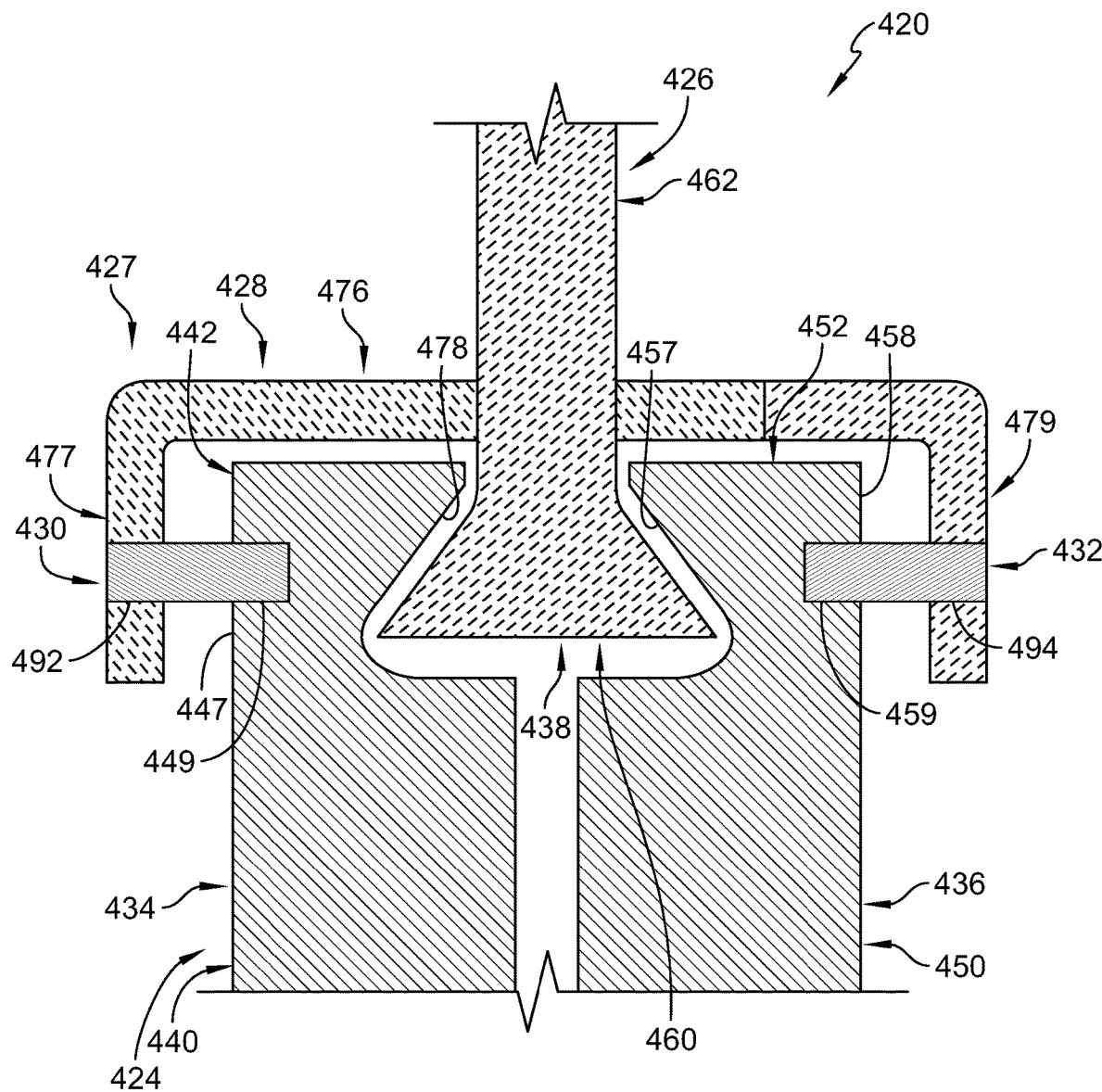
FIG. 7 is a diagrammatic and section view of another embodiment of a turbine wheel assembly adapted for use in the gas turbine engine of FIG. 1 showing a U-shaped platform arranged around the disk and coupled with the disk by two pins that extend axially into the platform and disk segments.
Figure 8:
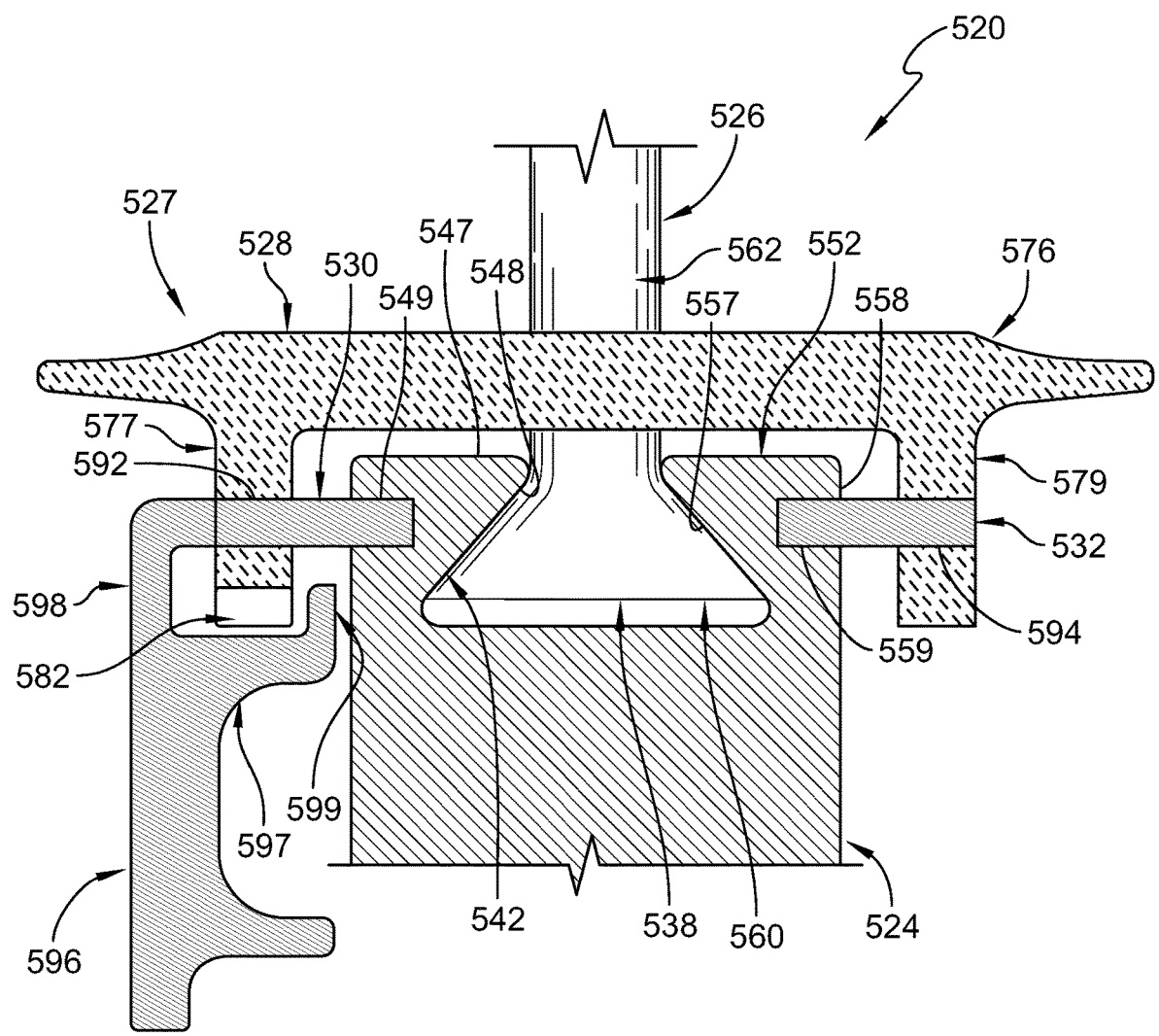
FIG. 8 is a diagrammatic and section view of another embodiment of a turbine wheel assembly adapted for use in the gas turbine engine of FIG. 1 showing a U-shaped platform arranged around the disk and coupled with the disk by two pins and further showing a cover plate interlocked with a forward end of the platform to block axial movement of the platform and pin.
Figure 9:
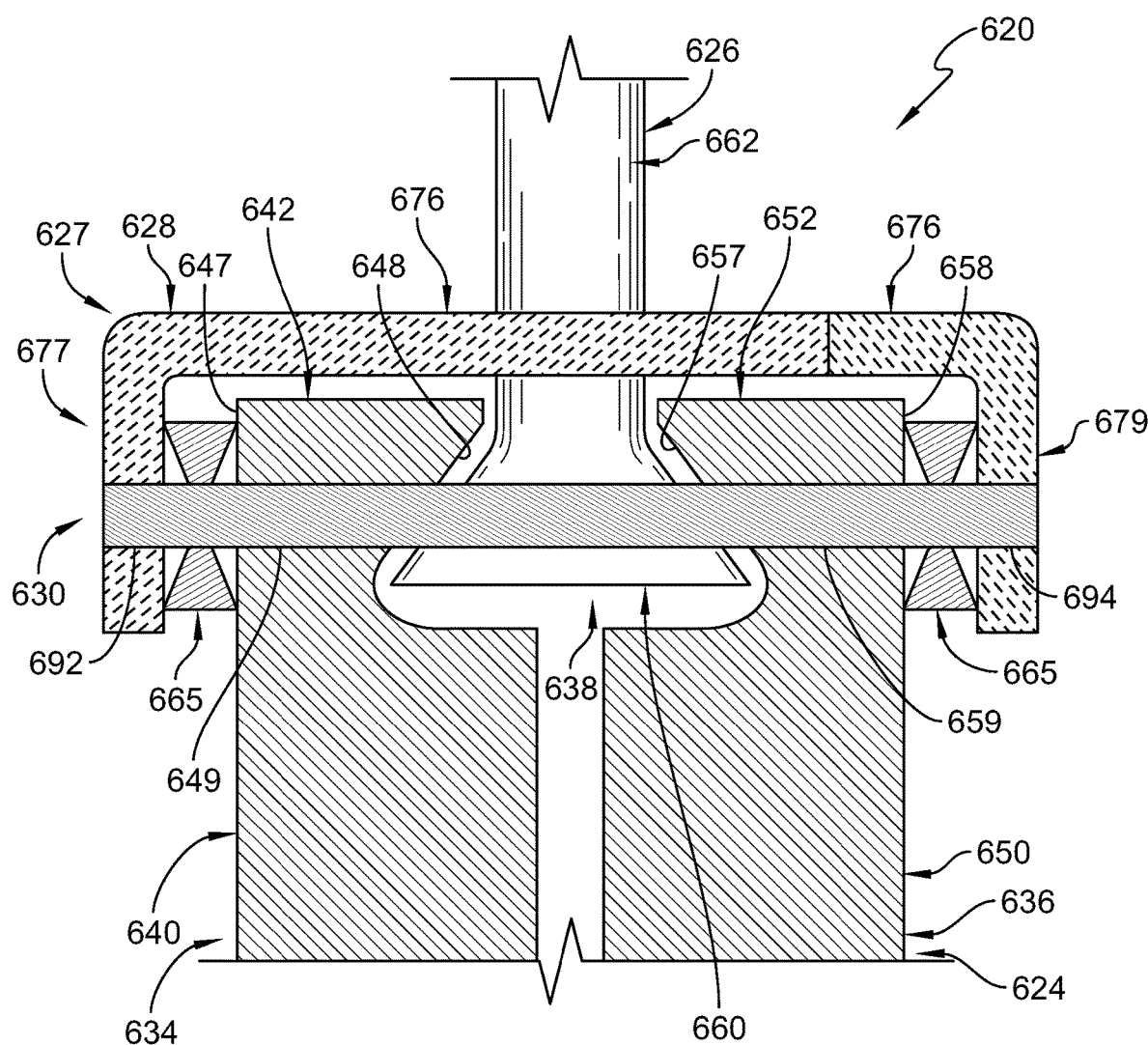
FIG. 9 is a diagrammatic and section view of another embodiment of a turbine wheel assembly adapted for use in the gas turbine engine of FIG. 1 showing a U-shaped platform arranged around the disk and a pin that extends axially through the disk and platform to couple the platform with the disk.

The disk 24 is formed to define a circumferentially extending blade-receiver channel 38 as shown in FIG. 2. The roots 60 of the blades 26 have circumferentially extending attachment features 66 that are located in the blade-receiver channel 38 of the disk 24 to couple the blades 26 with the disk 24. Illustratively, the attachment features 66 of the blades 26 are dovetail shaped when viewed circumferentially relative to the axis 11 as shown in FIG. 3. In other embodiments, the attachment features 66 may have other shapes when viewed circumferentially. In some embodiments, the platforms 28 have attachment features 88 received in the blade-receiver channel 38 as shown in FIGS. 4-6 and 10. In other embodiments, the platforms 28 are U-shaped and arranged around the disk 24 as shown in FIGS. 7-9.

Illustratively, the blades 26 comprise ceramic matrix composite materials. Providing ceramic matrix composite blades 26 with attachment features 66 that extend circumferentially may allow the attachment feature 66 of the blades 26 to be larger/thicker relative to typical metallic blades and may reduce the stress acting on the attachment feature 66. In illustrative embodiments, the platforms 28 are separate components from the blades 26 and are incorporated as an offloaded part. As a result, the blade attachments 66 may not support the centrifugal load associated with the platforms 28. The platforms 28 comprise ceramic matrix composite materials in the illustrative embodiment. In other embodiments, the blades 26 and/or the platforms 28 comprise metallic, monolithic ceramic, or composite materials.

The wheel assembly 20 is incorporated in the gas turbine engine 10 which includes a fan 12, a compressor 14, a combustor 16, and a turbine 18 as shown in FIG. 1. The fan 12 generates thrust for propelling an aircraft. The compressor 14 compresses and delivers air to the combustor 16. The combustor 16 mixes fuel with the compressed air received from the compressor 14 and ignites the fuel. The hot, high-pressure gases from the burning fuel are directed into the turbine 18 where the turbine 18 extracts work from the gases to drive the compressor 14 and the fan 12. In other embodiments, the gas turbine engine 10 may include a shaft, turboprop, or gearbox in place of the fan 12.

The turbine 18 includes a plurality of turbine wheel assemblies 20 and turbine vane assemblies 22 as suggested in FIG. 1. A portion of one of the turbine wheel assemblies 20 is shown in FIG. 2. Each turbine wheel assembly 20 is configured to interact with the hot combustion gases from the combustor 16 and rotate about the center axis 11 of the gas turbine engine 10 to generate power for driving the compressor 14 and the fan 12. A turbine vane assembly 22 is located between neighboring turbine wheel assemblies 20 to direct gases received from an upstream turbine wheel assembly 20 toward a downstream turbine wheel assembly 20.

One of the turbine wheel assemblies 20 shown in FIG. 2 includes the disk 24, the plurality of blades 26, and the platform system 27. The disk 24 is coupled to a shaft of the gas turbine engine 10 and is configured to rotate the shaft about the center axis 11 during operation of the gas turbine engine 10 to generate power. The plurality of blades 26 are shaped to interact with and be rotated by the hot gases that move axially along the flow path 25 of the gas turbine engine 10. The platform system 27 includes platforms 28 that are located between blades 26 and pins 30 that extend into the platforms 28 and the disk 24 to couple the platforms 28 with the disk 24. The platforms 28 are arranged circumferentially about the disk 24 to form the boundary of the flow path 25 of the gas turbine engine 10.

The disk 24 is illustratively a multi-piece disk 24 that includes a fore-disk segment 34 and an aft-disk segment 36 as shown in FIGS. 2 and 3. The aft-disk segment 36 is located axially aft of the fore-disk segment 34 to define the blade-receiver channel 38 between the fore-disk segment 34 and the aft-disk segment 36. In other embodiments, the disk 24 is a single piece component as shown, for example, in FIG. 8. The blade-receiver channel 38 extends circumferentially around the axis 11 and is sized to receive a portion of the blades 26. In the illustrative embodiment, the blade-receiver channel 38 is dovetail shaped when viewed circumferentially. The fore-disk segment 34 and the aft-disk segment 36 are made of metallic materials in the illustrative embodiment.

Figure 4:
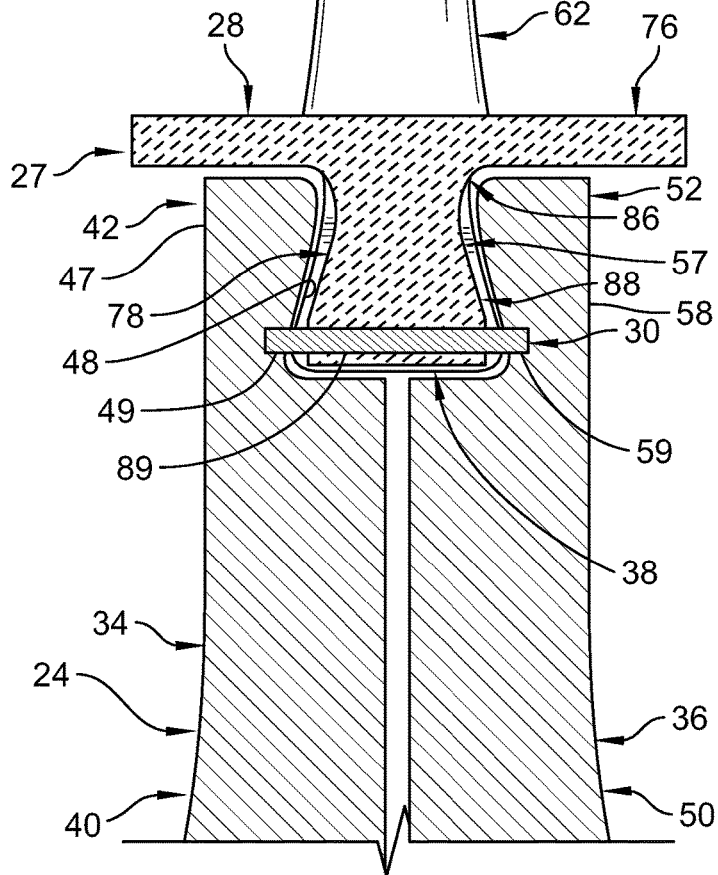
FIG. 4 is a diagrammatic and section view of the turbine wheel assembly of FIG. 2 showing the platform received in the channel defined in the multi-piece disk and a pin that extends into a blind hole formed in the fore-disk segment, through the platform and into a blind hole formed in the aft-disk segment to couple the platform with the multi-piece disk.

The fore-disk segment 34 includes a fore body 40 and a fore band 42 that extends circumferentially around the fore body 40 as shown in FIGS. 3 and 4. The fore body 40 is configured to couple with the shaft of the gas turbine engine 10 to transmit power to the shaft. The fore band 42 extends radially away from the fore body 40 and cooperates with the fore body 40 to define a circumferentially extending passage 45 that forms a portion of the blade-receiver channel 38 as shown in FIG. 3.

The fore band 42 includes an outer radial surface 46, a fore-facing surface 47, and an aft-facing surface 48 as shown in FIG. 3. The aft-facing surface 48 extends from the outer radial surface 46 toward the fore body 40. The aft-facing surface 48 is shaped to mate with the attachment feature 66 included in the roots 60 of the blades 26. Illustratively, the outer radial surface 46, the fore-facing surface 47, and the aft-facing surface 48 are continuous such that the roots 60 of the blades 26 are blocked from moving axially or radially out of the blade-receiver channel 38. In other words, the outer radial surface 46, the fore-facing surface 47, and the aft-facing surface 48 are formed without holes or slots that would allow the blades 26 to pass through without moving the disk segments 34, 36 apart from each other.

The aft-disk segment 36 includes an aft body 50 and an aft band 52 that extends circumferentially around the aft body 50 as shown in FIG. 3. The aft body 50 is configured to couple with the shaft of the gas turbine engine 10 to transmit power to the shaft. The aft band 52 extends radially away from the aft body 50 and cooperates with the aft body 50 to define a circumferentially extending passage 55 that forms a portion of the blade-receiver channel 38 as shown in FIG. 3. The aft-disk segment 36 and the fore-disk segment 34 are removably coupled together to be blocked from moving axially relative to each other and are coupled to rotate with one another.

The aft band 52 includes an outer radial surface 56, a fore-facing surface 57, and an aft-facing surface 58 as shown in FIG. 3. The fore-facing surface 57 extends from the outer radial surface 56 toward the aft body 50. The fore-facing surface 57 is shaped to mate with the attachment portions 66 of the roots 60 of the blades 26. Illustratively, the outer radial surface 56, the fore-facing surface 57, and the aft-facing surface 58 are continuous such that the roots 60 of the blades 26 are blocked from moving axially or radially out of the blade-receiver channel 38. In other words, the outer radial surface 56, the fore-facing surface 57, and the aft-facing surface 58 are formed without holes or slots sized that would allow the blades 26 to pass through without moving the disk segments 34, 36 apart from each other.

The fore band 42 is formed to include a blind hole 49 that extends axially into the aft-facing surface 48 toward the fore-facing surface 47 as shown in FIG. 4. The blind hole 49 opens into the blade-receiver channel 38. The blind hole 49 is sized to receive one of the pins 30. The aft band 52 is formed to include a blind hole 59 that extends axially into the fore-facing surface 57 toward the aft-facing surface 58. The blind hole 59 opens into the blade-receiver channel 38. The blind hole 59 is sized to receive the pin 30. Illustratively, the fore band 42 and the aft band 52 are formed to define a plurality of circumferentially arranged blind holes 49, 59 respectively.

Illustratively, the blade-receiver channel 38 is dovetail shaped when viewed circumferentially relative to the axis 11 as shown in FIG. 3. In other embodiments, the blade-receiver channel 38 is an alternative shape such as, for example, fir tree shape when viewed circumferentially. The blade-receiver channel 38 extends circumferentially and blocks radial movement of the blades 26 and platforms 28 out of the blade-receiver channel 38.

The aft-facing surface 48 included in the fore band 42 and the fore-facing surface 57 included in the aft band 44 cooperate to block the roots 60 of the blades 26 from exiting the blade-receiver channel 38 at any orientation of the blades 26 relative to the axis 11. For example, the blades 26 are blocked at all circumferential locations about the axis 11 and are blocked if the blades 26 are tilted or angled relative to the disk segments 34, 36. As a result, the fore-disk segment 34 is moved axially relative to the aft-disk segment 36 to insert or remove blades 26 during assembly of the turbine wheel assembly 20. In some embodiments, the roots 60 of the blades 26 are clamped by the disk segments 34, 36. In embodiments with a one-piece disk 24, the roots 60 of the blades 26 are shaped to be inserted into the blade-receiver channel 38 by tilting the blades 26 relative to the disk 24.

Each blade 26 includes the root 60 and the airfoil 62 that extends radially away from the root 60 relative to the center axis 11 as suggested in FIGS. 3 and 4. The root 60 of each blade 26 is received in the blade-receiver channel 38 to couple the blades 26 to the disk 24 for rotation with the disk 24. The airfoils 62 are shaped to be pushed circumferentially by the hot gases moving in the flow path 25 to cause the turbine wheel assembly 20 to rotate about the center axis 11 during operation of the gas turbine engine 10.

The root 60 of each blade 26 includes a stem 64 coupled with the airfoil 62 and an attachment feature 66 coupled with the stem 64 as shown in FIG. 3. The attachment feature 66 of the blade 26 is illustratively dovetail shaped when viewed circumferentially relative to the axis 11. The attachment feature 66 includes a first side face, a second side face spaced apart circumferentially from the first side face, a fore engagement face 72, and an aft engagement face 74 spaced apart axially from the fore engagement face 72. The first side face and the second side face extend between and interconnect the fore engagement face 72 and the aft engagement face 74.

The fore engagement face 72 engages directly the aft-facing surface 48 of the fore-disk segment 34 as shown in FIG. 3. The aft engagement face 74 engages directly the fore-facing surface 57 of the aft-disk segment 36. The fore engagement face 72 and the aft-facing surface 48 of the fore-disk segment 34 have complementary shapes. The aft engagement face 74 and the fore-facing surface 57 of the aft-disk segment 36 have complementary shapes.

Illustratively, the root 60 and the airfoil 62 of each blade 26 are integrally formed such that each blade 26 is a one-piece integral component. The blades 26 comprise ceramic matrix composite materials in some embodiments. The blade 26 comprises only ceramic matrix composite materials in the illustrative embodiment. In other embodiments, the blades 26 may comprise one or more of ceramic matrix composite materials, composite materials, and metallic materials.

The platform system 27 includes the plurality of platforms 28 and the pins 30 as shown in FIG. 4. Each platform 28 includes an outer radial wall 76 and a rib 78. The outer radial wall 76 is arranged partway around the blade 26 to define the boundary of the flow path 25 of the gases. The rib 78 extends radially inward from the outer radial wall 76 and is located in the blade-receiver channel 38. The rib 78 includes a stem 86 coupled with the outer radial wall 76 and an attachment feature 88 coupled with the stem 86. The attachment feature 88 is formed to include a passageway 89 that extends axially through the attachment feature 88. The outer radial wall 76 of the platform 28 includes a first edge and a second edge spaced apart circumferentially from the first edge and the rib 78 is spaced apart circumferentially from the first and second edges of the outer radial wall 76 as shown in FIG. 2. The rib 78 may be dovetail shaped when viewed circumferentially in some embodiments.

One of the pins 30 extends into the blind hole 49 formed in the fore-disk segment 34, through the passageway 89 formed in the attachment feature 88 of the platform 28, and into the blind hole 59 formed in the aft-disk segment 36 to couple the platform 28 with the disk 24 for rotation therewith as shown in FIG. 4. During assembly of the wheel assembly 20, the pin 30 is located in the passageway 89 of the platform 28. The fore-disk segment 34 and the aft-disk segment 36 are moved axially relative to the platform 28 to trap the platform 28 and the pin 30 between the segments 34, 36. The fore-disk segment 34 and the aft-disk segment 36 are then coupled together for rotation and movement with each other.

Illustratively, the outer radial wall 76 and the rib 78 of each platform 28 are integrally formed such that each platform 28 is a one-piece integral component. The platforms 28 comprise ceramic matrix composite materials in some embodiments. The platforms 28 comprise only ceramic matrix composite materials in the illustrative embodiment. In other embodiments, the platforms 28 may comprise one or more of ceramic matrix composite materials, composite materials, and metallic materials. In the illustrative embodiments, the pins 30 are made of metallic materials.

Figure 5:
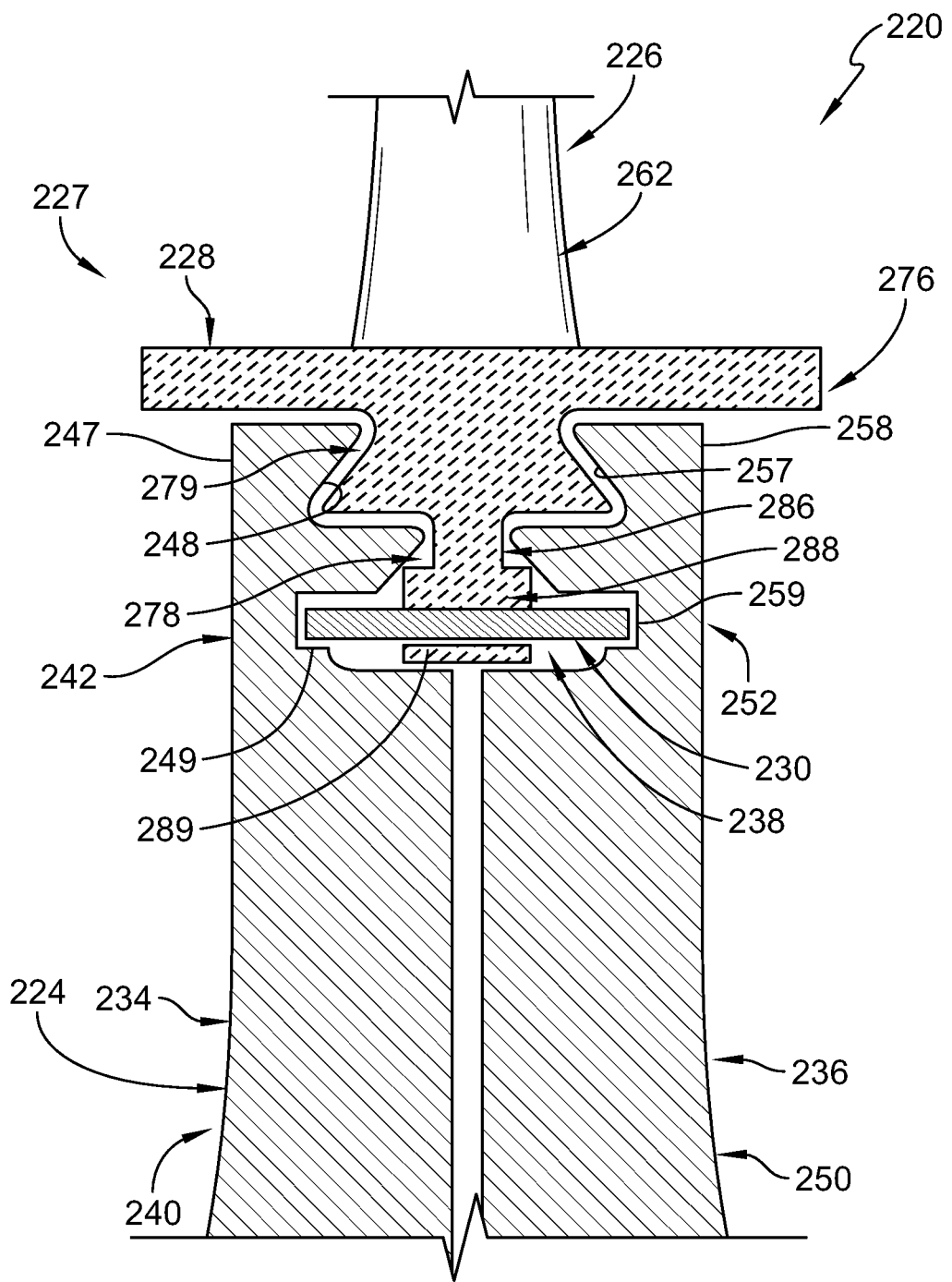
FIG. 5 is a diagrammatic and section view of another embodiment of a turbine wheel assembly that is similar to the assembly of FIG. 4 and adapted for use in the gas turbine engine of FIG. 1 showing that the platform includes an outer radial wall, an attachment feature that receives a pin, and a support strut located radially between the outer radial wall and the attachment feature.

Another embodiment of a turbine wheel assembly 220 in accordance with the present disclosure is shown in FIG. 5. The turbine wheel assembly 220 is substantially similar to the turbine wheel assembly 20 shown in FIGS. 1-4 and described herein. Accordingly, similar reference numbers in the 200 series indicate features that are common between the turbine wheel assembly 20 and the turbine wheel assembly 220. The description of the turbine wheel assembly 20 is incorporated by reference to apply to the turbine wheel assembly 220, except in instances when it conflicts with the specific description and the drawings of the turbine wheel assembly 220.

The turbine wheel assembly 220 includes a disk 224, a plurality of blades 226, and a platform system 227 that includes platforms 228 and pins 230 as shown in FIG. 5. The disk 224 includes a fore-disk segment 234 and an aft-disk segment 236 that cooperate to define a blade-receiver channel 238. Each blade 226 includes a root and an airfoil 262.

The fore-disk segment 234 includes a fore body 240 and a fore band 242 and the aft-disk segment 236 includes an aft body 250 and an aft band 252 as shown in FIG. 5. The fore-disk segment 234 is formed to include a blind hole 249 that extends axially into an aft-facing surface 248 and toward a fore-facing surface 247 of the fore band 242 of the fore-disk segment 234. The aft-disk segment 236 is formed to include a blind hole 259 that extends axially into a fore-facing surface 257 and toward an aft-facing surface 258 of the aft band 252 of the aft-disk segment 236. The disk segments 234, 236 may include a plurality of holes 249, 259 respectively arranged circumferentially around the axis 11. In the illustrative embodiment, the fore-disk segment 234 and the aft-disk segment 236 of the disk 224 are separate components. In other embodiments, the fore-disk segment 234 and the aft-disk segment 236 are a single integrally formed component.

Each platform 228 includes an outer radial wall 276, a rib 278, and a support strut 279 as shown in FIG. 5. The rib 278 includes a stem 286 and an attachment feature 288 that is formed to define a passageway 289 that extends axially through the attachment feature 288. The support strut 279 is located radially between the outer radial wall 276 and the attachment feature 288 and may provide additional support to the outer radial wall 276. For example, the outer radial wall 276 may include fore and aft wings that extend axially outward and the support strut 279 may reduce radial bending of the wings during use of the engine 10. In the illustrative embodiment, the support strut 279 is dovetail shaped when viewed circumferentially. One of the pins 230 extends into the blind hole 249 formed in the fore-disk segment 234, through the passageway 289 formed in the attachment feature 288 of the platform 228, and into the blind hole 259 formed in the aft-disk segment 236.

Figure 6:
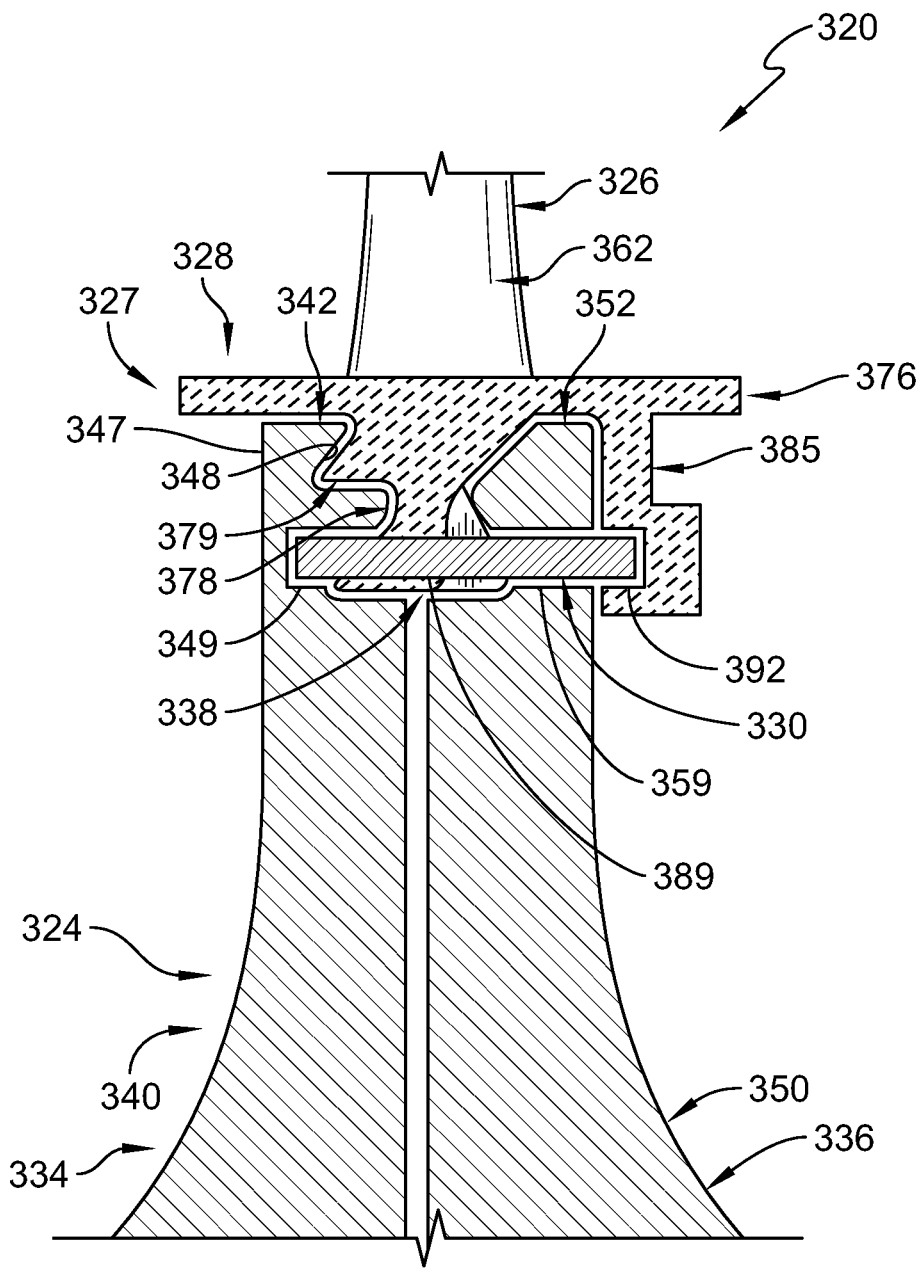
FIG. 6 is a diagrammatic and section view of another embodiment of a turbine wheel assembly adapted for use in the gas turbine engine of FIG. 1 showing a platform configured to translate radially into the channel defined by the disk and a pin that extends into the fore-disk segment, through the platform, through the aft-disk segment, and into a support arm of the platform.

Another embodiment of a turbine wheel assembly 320 in accordance with the present disclosure is shown in FIG. 6. The turbine wheel assembly 320 is substantially similar to the turbine wheel assembly 20 shown in FIGS. 1-4 and described herein. Accordingly, similar reference numbers in the 300 series indicate features that are common between the turbine wheel assembly 20 and the turbine wheel assembly 320. The description of the turbine wheel assembly 20 is incorporated by reference to apply to the turbine wheel assembly 320, except in instances when it conflicts with the specific description and the drawings of the turbine wheel assembly 320.

The turbine wheel assembly 320 includes a disk 324, a plurality of blades 326, and a platform system 327 that includes platforms 328 and pins 330 as shown in FIG. 6. The disk 324 includes a fore-disk segment 334 and an aft-disk segment 336 that cooperate to define a blade-receiver channel 338. Each blade 326 includes a root and an airfoil 362.

The fore-disk segment 334 includes a fore body 340 and a fore band 342 and the aft-disk segment 336 includes an aft body 350 and an aft band 352 as shown in FIG. 6. The fore-disk segment 334 is formed to include a blind hole 349 that extends axially into an aft-facing surface 348 and toward a fore-facing surface 347 of the fore band 342 of the fore-disk segment 334. The aft-disk segment 336 is formed to include a thru-hole 359 that extends axially through the aft-disk segment 336. The disk segments 334, 336 may include a plurality of holes 349, 359 respectively arranged around the axis 11.

Each platform 328 includes an outer radial wall 376, a rib 378, and a support arm 385 as shown in FIG. 6. The outer radial wall 376 is arranged partway around a blade 326. The rib 378 is formed to define a passageway 389 that extends axially through the rib 378. Each platform 328 further includes a support strut 379 in the illustrative embodiment.

The support arm 385 extends radially inward away from the outer radial wall 376 as shown in FIG. 6. The support arm 385 is spaced apart axially from the rib 378 to locate the aft-disk segment 336 between the support arm 385 and the rib 378. The support arm 385 is formed to include an axially aft extending blind hole 392. In other embodiments, the support arm 385 is formed to include an axially extending thru-hole.

The pin 330 extends into the blind hole 349 formed in the fore-disk segment 334, through the rib 378 of the platform 328, through the thru-hole 359 formed in the aft-disk segment 336, and into the blind hole 392 formed in the support arm 385 of the platform 328 as shown in FIG. 6. In other embodiments, the support arm 385 is formed on the forward end of the platform 328 and the pin 330 extends axially through the fore-disk segment 334 and into the support arm 385.

During assembly, the pin 330 is located in the rib 378 of the platform 328, in the thru-hole 359 formed in the aft-disk segment 336, and in the blind hole 392 of the support arm 385. The fore-disk segment 334 is aligned with and moved axially relative to the platform 328 to receive a portion of the pin 330 in the blind hole 349 formed in the fore-disk segment 334. The fore-disk segment 334 and the aft-disk segment 336 are then coupled together to block the pin 330 and the platform 328 from moving out of the blade-receiver channel 338.

Another embodiment of a turbine wheel assembly 420 in accordance with the present disclosure is shown in FIG. 7. The turbine wheel assembly 420 is substantially similar to the turbine wheel assembly 20 shown in FIGS. 1-4 and described herein. Accordingly, similar reference numbers in the 400 series indicate features that are common between the turbine wheel assembly 20 and the turbine wheel assembly 420. The description of the turbine wheel assembly 20 is incorporated by reference to apply to the turbine wheel assembly 420, except in instances when it conflicts with the specific description and the drawings of the turbine wheel assembly 420.

The turbine wheel assembly 420 includes a disk 424, a plurality of blades 426, and a platform system 427 that includes platforms 428 and pins 430, 432 as shown in FIG. 7. The disk 424 includes a fore-disk segment 434 and an aft-disk segment 436 that cooperate to define a blade-receiver channel 438. The fore-disk segment 434 includes a fore body 440 and a fore band 442 and the aft-disk segment 436 includes an aft body 450 and an aft band 452 as shown in FIG. 7. Each blade 426 includes a root 460 and an airfoil 462.

The fore-disk segment 434 is formed to include a blind hole 449 that extends axially into a fore-facing surface 447 and toward an aft facing surface 448 of the fore-disk segment 434. The aft-disk segment 436 is formed to include a blind hole 459 that extends axially into an aft-facing surface 458 and toward a fore-facing surface 457 of the aft-disk segment 436. The disk segments 434, 436 may include a plurality of holes 449, 459 respectively arranged around the axis 11. In some embodiments, the disk 424 is a single, one-piece component.

Each platform 428 is U-shaped and includes an outer radial wall 476, a fore wall 477, and an aft wall 479 as shown in FIG. 7. The outer radial wall 476 is arranged partway around a blade 426. The fore wall 477 extends radially inward away from the outer radial wall 476. The aft wall 479 extends radially inward away from the outer radial wall 476 and is spaced apart axially from the fore wall 477 to locate the fore-disk segment 434 and the aft-disk segment 436 between the fore and aft walls 477, 479. The aft wall 479 is offset circumferentially from the fore wall 477 in the illustrative embodiment. As a result, FIG. 7 shows a forward portion of a first platform 428 and an aft portion of a second platform 428.

The fore wall 477 of each platform 428 is formed to include a thru-hole 492 that is aligned radially and circumferentially with the blind hole 449 formed in the fore-disk segment 434 as shown in FIG. 7. The aft wall 479 is formed to include a thru-hole 494 that is aligned radially and circumferentially with a blind hole 459 formed in the aft-disk segment 436. A first pin 430 included in the plurality of pins extends through the thru-hole 492 formed in the fore wall 477 and into the blind hole 449 formed in the fore-disk segment 434. A second pin 432 included in the plurality of pins extends through the thru-hole 494 formed in the aft wall 479 and into the blind hole 459 formed in the aft-disk segment 436 to couple the platform 428 with the disk 424.

In the illustrative embodiment, the aft wall 479 is offset circumferentially relative to the fore wall 477 such that the blind hole 494 is spaced apart circumferentially from the blind hole 492 and the second pin 432 is spaced apart circumferentially from the first pin 430 as suggested in FIG. 7. As a result, the aft wall 479 of one platform 428 is partway aligned circumferentially with the fore wall 477 of an adjacent platform 428.

Another embodiment of a turbine wheel assembly 520 in accordance with the present disclosure is shown in FIG. 8. The turbine wheel assembly 520 is substantially similar to the turbine wheel assembly 20 shown in FIGS. 1-4 and described herein. Accordingly, similar reference numbers in the 500 series indicate features that are common between the turbine wheel assembly 20 and the turbine wheel assembly 520. The description of the turbine wheel assembly 20 is incorporated by reference to apply to the turbine wheel assembly 520, except in instances when it conflicts with the specific description and the drawings of the turbine wheel assembly 520.

The turbine wheel assembly 520 includes a disk 524, a plurality of blades 526, a platform system 527 that includes platforms 528 and pins 530, and a cover plate 596 as shown in FIG. 8. The disk 524 includes a fore band 542 and an aft band 552 that cooperate to define a blade-receiver channel 538. Each blade 526 includes a root 560 and an airfoil 562.

The fore band 542 is formed to include a blind hole 549 that extends axially into a fore-facing surface 547 and toward an aft facing surface 548 of the fore band 542 as shown in FIG. 8. The aft band 552 is formed to include a blind hole 559 that extends axially into an aft-facing surface 558 and toward a fore-facing surface 557 of the aft band 552. The disk 524 may include a plurality of holes 549, 559 respectively arranged around the axis 11. In other embodiments, the disk 524 may include a fore-disk segment and an aft-disk segment that are formed as separate components.

Each platform 528 is U-shaped and includes an outer radial wall 576, a fore wall 577, and an aft wall 579 as shown in FIG. 8. The outer radial wall 576 is arranged partway around a blade 526. The fore wall 577 extends radially inward away from the outer radial wall 576. The aft wall 579 extends radially inward away from the outer radial wall 576 and is spaced apart axially from the fore wall 577 to locate the fore band 542 and the aft band 552 of the disk 524 between the fore and aft walls 577, 579. The aft wall 579 is aligned circumferentially with the fore wall 577 in the illustrative embodiment.

The fore wall 577 is formed to include a thru-hole 592 that is aligned radially and circumferentially with the blind hole 549 formed in the fore band 542 as shown in FIG. 8. The aft wall 579 is formed to include a thru-hole 594 that is aligned radially and circumferentially with the blind hole 559 formed in the aft band 552. A first pin 530 included in the plurality of pins extends through the thru-hole 592 formed in the fore wall 577 and into the blind hole 549 formed in the fore band 542. A second pin 532 included in the plurality of pins extends through the thru-hole 594 formed in the aft wall 579 and into the blind hole 559 formed in the aft band 552 to couple the platform 528 with the disk 524. In the illustrative embodiment, the second pin 532 is aligned radially and circumferentially with the first pin 530 as suggested in FIG. 8.

The cover plate 596 is interlocked with the platform 528 to block axial movement of the platform 528 and pins 530 as suggested in FIG. 8. The cover plate 596 includes a circumferentially extending body 597, a pin-retention flange 598, and a lock tab 599. The pin-retention flange 598 extends radially outward away from the body 597 and overlaps the pins 530. The lock tab 599 extends radially outward away from the body 597 and is spaced apart axially from the pin-retention flange 598 to locate the fore wall 577 of the platform 528 therebetween.

The fore wall 577 of the platform 528 is formed to include a cutout 582 that extends radially outward into the fore wall 577 and circumferentially partway about the axis 11 as shown in FIG. 8. The cutout 582 is sized to receive the lock tab 599 of the cover plate 596 when the lock tab 599 is aligned circumferentially with the cutout 582. During assembly, the lock tab 599 of the cover plate 596 is aligned axially and circumferentially with the cutout 582. The cover plate 596 is moved axially to pass the lock tab 599 through the cutout 582. The cover plate 596 is rotated about the axis 11 to cause the lock tab 599 to be offset circumferentially from the cutout 582 to interlock the cover plate 596 with the platform 528. In other embodiments, the cover plate 596 is configured to interlock with the aft wall 579 of the platform 528.

Another embodiment of a turbine wheel assembly 620 in accordance with the present disclosure is shown in FIG. 9. The turbine wheel assembly 620 is substantially similar to the turbine wheel assembly 20 shown in FIGS. 1-4 and described herein. Accordingly, similar reference numbers in the 600 series indicate features that are common between the turbine wheel assembly 20 and the turbine wheel assembly 620. The description of the turbine wheel assembly 20 is incorporated by reference to apply to the turbine wheel assembly 620, except in instances when it conflicts with the specific description and the drawings of the turbine wheel assembly 620.

The turbine wheel assembly 620 includes a disk 624, a plurality of blades 626, and a platform system 627 that includes platforms 628 and pins 630 as shown in FIG. 9. The disk 624 includes a fore-disk segment 634 and an aft-disk segment 636 that cooperate to define a blade-receiver channel 638. The fore-disk segment 634 includes a fore body 640 and a fore band 642 and the aft-disk segment 636 includes an aft body 650 and an aft band 652 as shown in FIG. 9. Each blade 626 includes a root 660 and an airfoil 662.

The fore-disk segment 634 is formed to include a thru-hole 649 that extends axially through the fore band 642 as shown in FIG. 9. The thru-hole 649 extends through a fore-facing surface 647 and an aft-facing surface 648 of the fore band 642. The aft-disk segment 636 is formed to include a thru-hole 659 that extends axially through the aft band 652. The thru hole 659 extends through a fore-facing surface 657 and an aft-facing surface 658 of the aft band 652. The disk segments 634, 636 may include a plurality of holes 649, 659 respectively arranged circumferentially around the axis 11. In the illustrative embodiment, the fore-disk segment 634 and the aft-disk segment 636 of the disk 624 are separate components. In other embodiments, the fore-disk segment 634 and the aft-disk segment 636 are integrally formed.

Each platform 628 is U-shaped and includes an outer radial wall 676, a fore wall 677, and an aft wall 679 as shown in FIG. 9. The outer radial wall 676 is arranged partway around a blade 626. The fore wall 677 extends radially inward away from the outer radial wall 676. The aft wall 679 extends radially inward away from the outer radial wall 676 and is spaced apart axially from the fore wall 677 to locate the fore-disk segment 634 and the aft-disk segment 636 between the fore and aft walls 677, 679.

The aft wall 679 is offset circumferentially from the fore wall 677 in the illustrative embodiment. As a result, a forward end of a first platform 628 and an aft end of a second platform 628 are shown in FIG. 9. In other embodiments, the aft wall 679 and the fore wall 677 are circumferentially aligned.

The fore wall 677 is formed to include a thru-hole 692 that is aligned radially and circumferentially with the thru-hole 649 formed in the fore-disk segment 634 as shown in FIG. 9. The aft wall 679 is formed to include a thru-hole 694 that is aligned radially and circumferentially with the thru-hole 659 formed in the aft-disk segment 636. A pin 630 extends through the thru-hole 692 formed in the fore wall 677, through the thru-hole 649 formed in the fore-disk segment 634, through the thru-hole 659 formed in the aft-disk segment 636, and into a thru-hole 694 formed in an aft wall 679 of an adjacent platform 628 to couple the platforms 628 with the disk 624 as shown in FIG. 9. A second pin 633 included in the plurality of pins 630 extends through the thru-hole 594 formed in the aft wall 679 of the platform 628. The pins 630 are located circumferentially between blade roots 660.

The platform system 627 further includes washers or spacers 665 as shown in FIG. 9. A spacer 665 is located between the fore wall 677 and the fore-disk segment 634. A spacer 665 is located between the aft wall 679 and the aft-disk segment 636.

Figure 10:
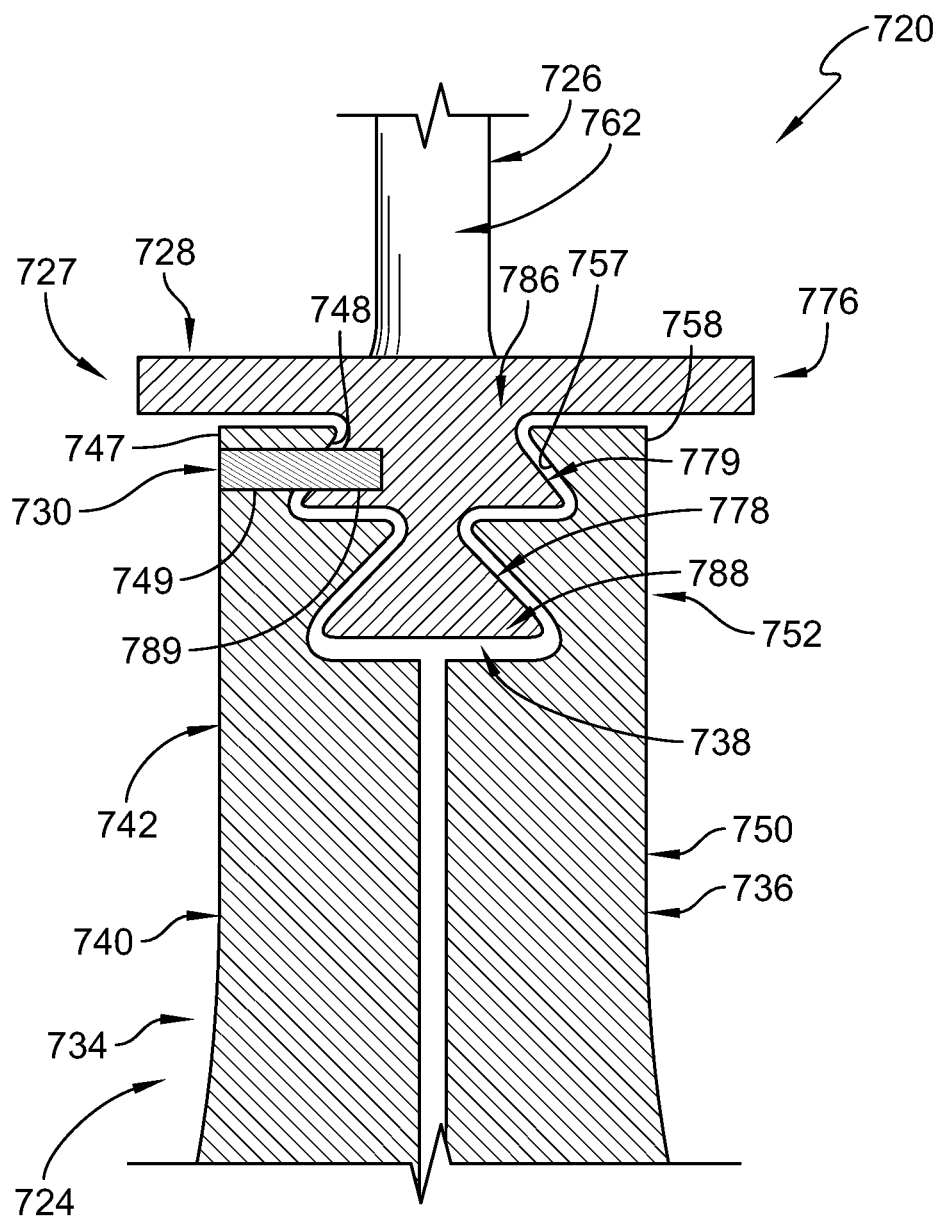
FIG. 10 is a diagrammatic and section view of another embodiment of a turbine wheel assembly adapted for use in the gas turbine engine of FIG. 1 showing a platform received in the channel defined by the disk and a pin that extends axially through one of the disk segments and into the platform to couple the platform with the disk.

Another embodiment of a turbine wheel assembly 720 in accordance with the present disclosure is shown in FIG. 10. The turbine wheel assembly 720 is substantially similar to the turbine wheel assembly 20 shown in FIGS. 1-4 and described herein. Accordingly, similar reference numbers in the 700 series indicate features that are common between the turbine wheel assembly 20 and the turbine wheel assembly 720. The description of the turbine wheel assembly 20 is incorporated by reference to apply to the turbine wheel assembly 720, except in instances when it conflicts with the specific description and the drawings of the turbine wheel assembly 720.

The turbine wheel assembly 720 includes a disk 724, a plurality of blades 726, and a platform system 727 that includes platforms 728 and pins 730 as shown in FIG. 10. The disk 724 includes a fore-disk segment 734 and an aft-disk segment 736 that cooperate to define a blade-receiver channel 738. The fore-disk segment 634 includes a fore body 740 and a fore band 742 and the aft-disk segment 736 includes an aft body 750 and an aft band 752 as shown in FIG. 9. Each blade 726 includes a root and an airfoil 762. The disk 724 may be a single integral component in other embodiments.

The fore-disk segment 734 is formed to include a thru-hole 749 that extends axially through the fore-disk segment 734. The thru-hole 749 extends through a fore-facing surface 747 and an aft-facing surface 748 of the fore band 742 and opens into the blade-receiver channel 738. The fore-disk segment 734 may include a plurality of holes 749 arranged circumferentially about the axis 11. In other embodiments, the aft-disk segment 736 is formed to include a thru-hole that extends axially into the aft-disk segment 736.

Each platform 728 includes an outer radial wall 776 and a rib 778. The outer radial wall 776 is arranged partway around blades 726. The rib 778 extends radially inward from the outer radial wall 776 and is located in the blade-receiver channel 738. The rib 778 includes a stem 786 coupled with the outer radial wall 776 and an attachment feature 788 coupled with the stem 786.

The platform 728 further includes a support strut 779 in the illustrative embodiment. The support strut 779 is located radially between the outer radial wall 776 and the attachment feature 788. The support strut 779 is formed to include a blind hole 789 that extends axially into the support strut 779. One of the pins 730 extends axially through the thru-hole 749 formed in the fore-disk segment 734 and into the blind hole 789 formed in the support strut 779 of the platform 728. In other embodiments, the blind hole 789 is formed in the attachment feature 788 and the pin 730 extends into the attachment feature 788. In other embodiments, the pin 730 extends through the aft-disk segment 736 and into an aft end of the platform 728.

As ceramic matrix composites (CMC) materials and designs mature, they may be used in turbine blade applications. Ceramic matrix composite components may be capable of operating at higher temperatures and deliver cooling air savings and/or specific fuel consumption reductions. Ceramic matrix composite components may offer weight reductions as compared to a metallic blade system. Ceramic matrix composite blades may be lighter than metallic blades and the size and weight of the disks may also be reduced when using ceramic matrix composite blades.

The ceramic matrix composite material may also have a reduction in strength as compared to metallic blades. Using ceramic matrix composite blades with designs similar to or based on metallic blades in an existing systems may not be practical. The present disclosure provides a wheel assembly configured to reduce the stress at the attachment of the blade by flipping the orientation of the attachment feature of the blade to extend circumferentially.

Generally attachments on blades are oriented with the axis of the engine (axially). Flipping this general orientation from axially to circumferential (or tangential) may allow the stalk/attachment region to be larger/thicker effectively reducing the pressure over area stress. In some embodiments, the platform features are removed from the blade component and instead incorporated as an offloaded part. With such configurations, the blade attachment may not support the centrifugal load associated with the platforms. The platform component of each embodiment of the present disclosure could be made from metallic or ceramic matrix composite materials.

In some embodiments, a pin hole 89 is added into the primary platform attachment feature 88 as shown in FIGS. 4 and 5. The pin 30 could then be added that would engage both the forward and aft-disk segments 34, 36 in blind holes 49, 59. An added benefit of this concept may be that the pins 30 may act as an anti-rotation feature for the blades 26.

In some embodiments, the platform 328 is made to drop radially in over the aft-disk segment 336 as shown in FIG. 6. The pin 330, which is offset circumferentially from the centered attachment dovetail, fits into holes in both disk segments 334, 336 and protrudes out the aft-disk segment 336 to limit radial deflections of the aft angel wing. The hole in the aft-disk segment 336 is a thru-hole 359 and the hole in the fore-disk segment 334 is a blind hole 349. In other embodiments, the thru-hole 359 is flipped and formed in the fore-disk segment 334. Once the rotor is completely assembled, the pin 330 is trapped and may provide an anti-rotation feature for the blades 326.

In some embodiments, the pins 730 go through only one of the disk segments 734, 736, either the fore-disk segment 734 or aft-disk segment 736 as shown in FIG. 10. When the platforms 728 and blades 726 are installed into the disk segments 734, 736, the pins 730 are pushed through the disk segment and protrude to engage a hook in the platform 728 which may limit radial deflections of the wings of the platform 728.

In some embodiments, the platforms may or may not be tied into the blade dovetail attachments in the disk as shown in FIGS. 7-9. If the platforms include the center rib attachment, the platform deflections may be minimized. If the platforms do not have the center rib attachment, more area for blade attachment material may be provided in the blade-receiver channel 38. In one embodiment, the platform generally has an upside down U-shape with holes for pinning on the fore and aft walls as shown in FIGS. 7 and 8. In other embodiments, the pin extends all the way through both disk segments 34, 36 and acts as an anti-rotation feature for the blades 26 as shown in FIG. 9. In either embodiment, the platforms 28 may not be able to be positioned until the disk segments 34, 36 are together. As such, the platform U-channel may be wider than the disk segments 34, 36 axially leaving a gap therebetween. The gap may be filled with a shim/washer as shown in FIG. 9.

In some embodiments, the platform 528 is retained radially by the pins 530 and axially by a cover plate 596 as shown in FIG. 8. A slot or groove 582 in the platform fore wall 577 can be aligned with a finger 599 in the cover plate 596 for axial positioning. Then the cover plate 596 may be rotated relative to the platform 528 and locked into a fixed position preventing axial motion of the platform 528.

A method for assembling a turbine wheel assembly in accordance with the present disclosure may include a number of steps. The method includes providing a multi-piece disk having a first-disk segment and a second-disk segment, a blade that includes a root and an airfoil that extends radially away from the root relative to an axis, the root being dovetail shaped when viewed circumferentially relative to the axis, and a platform system that includes a platform and a pin. The method includes locating the root of the blade in a circumferentially extending passage formed in the first-disk segment. The method includes positioning the platform adjacent the first-disk segment. The method includes inserting the pin into the platform and the first-disk segment to couple the platform with the first-disk segment for movement therewith. The method includes moving the second-disk segment relative to the first-disk segment to locate the root of the blade in a circumferentially extending passage formed in the second-disk segment. The second-disk segment may be moved before or after inserting the pin into the platform and the first-disk segment. The method includes blocking relative movement between the first-disk segment and the second-disk segment. The method may further include inserting the pin into the second-disk segment.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A wheel assembly for a gas turbine engine, the wheel assembly comprising:
a multi-piece disk adapted to rotate about an axis during use of the gas turbine engine, the multi-piece disk including a fore-disk segment and an aft-disk segment located axially aft of the fore-disk segment to define a blade-receiver channel that extends circumferentially around the axis,
a blade adapted to interact with gases during use of the gas turbine engine, the blade including a root located in the blade-receiver channel and an airfoil that extends radially away from the root, and the root having a dovetail-shaped portion when viewed circumferentially relative to the axis that is engaged by the fore-disk segment and the aft-disk segment to block radial and axial movement of the blade in the blade-receiver channel, and
a platform system that includes a platform arranged partway around the blade to define a boundary of a flow path of the gases and a first pin that extends axially into the platform and into at least one of the fore-disk segment and the aft-disk segment to couple the platform with the multi-piece disk for rotation therewith and block circumferential movement of the blade and the platform relative to the multi-piece disk about the axis,
wherein the platform is a separate component from the blade and a portion of the platform is located in the blade-receiver channel and engages the root of the blade to block circumferential movement of the blade relative to the multi-piece disk about the axis.

2. The wheel assembly of claim 1, wherein the first pin extends into the fore-disk segment, through the platform, and into the aft-disk segment.

3. The wheel assembly of claim 2, wherein the fore-disk segment is formed to include a fore blind hole that opens into the blade-receiver channel, the aft-disk segment is formed to include an aft blind hole that opens into the blade-receiver channel, and the first pin extends into the fore blind hole, through the platform, and into the aft blind hole.

4. The wheel assembly of claim 2, wherein the fore-disk segment is formed to include a fore blind hole that opens into the blade-receiver channel, the aft-disk segment is formed to include an aft thru-hole that extends axially through the aft-disk segment and opens into the blade-receiver channel, and the first pin extends into the fore blind hole, through a first portion of the platform, through the aft thru-hole, and into a second portion of the platform.

5. The wheel assembly of claim 1, wherein the platform includes an outer radial wall, a fore wall that extends radially inward from the outer radial wall, and an aft wall that extends radially inward from the outer radial wall, the aft wall is spaced apart axially from the fore wall to locate the multi-piece disk therebetween.

6. The wheel assembly of claim 5, wherein the fore-disk segment is formed to include a fore blind hole that extends axially aft into the fore-disk, the aft-disk segment is formed to include an aft blind hole that extends axially forward into the aft-disk, the first pin extends into the fore wall of the platform and into the fore blind hole, and the platform system includes a second pin that extends into the aft wall of the platform and into the aft blind hole.

7. The wheel assembly of claim 6, wherein the first pin is spaced apart circumferentially from the second pin.

8. The wheel assembly of claim 5, wherein the fore-disk segment is formed to include a fore thru-hole that extends axially through the fore-disk segment and opens into the blade-receiver channel, the aft-disk segment is formed to include an aft thru-hole that extends axially through the aft-disk segment and opens into the blade-receiver channel, and the first pin extends into the fore wall of the platform, through the fore thru-hole, and through the aft thru-hole.

9. The wheel assembly of claim 1, wherein the fore-disk segment is formed to include a thru-hole that extends axially through the fore-disk segment and opens into the blade-receiver channel and the first pin extends through the thru-hole and into the platform.

10. The wheel assembly of claim 1, wherein the platform includes an outer radial wall arranged partway around the blade to define the boundary of a flow path of the gases and a rib that extends radially inward from the outer radial wall, the rib is located in the blade-receiver channel of the multi-piece disk and engages the root of the blade, and the first pin extends axially into the rib of the platform.

11. The wheel assembly of claim 10, wherein the rib of the platform is dovetail-shaped when viewed circumferentially relative to the axis.

12. The wheel assembly of claim 11, wherein the outer radial wall of the platform includes a first edge and a second edge spaced apart circumferentially from the first edge and the rib is spaced apart circumferentially from the first and second edges of the outer radial wall.

13. The wheel assembly of claim 1, wherein the root of the blade includes a fore engagement surface engaged with an aft-facing surface of the fore-disk segment and an aft engagement surface spaced apart axially from the fore engagement surface and engaged with a forward-facing surface of the aft-disk segment to block movement of the blade in the blade-receiving channel relative to the disk.

14. The wheel assembly of claim 1, wherein the blade and the platform comprise ceramic matrix composite material and the pin comprises metallic material.

15. A wheel assembly comprising:
a disk formed to define a blade-receiver channel that extends circumferentially around an axis, the disk including a first-disk segment and a second-disk segment located axially adjacent the first-disk segment to define the blade-receiver channel therebetween,
a blade that includes a circumferentially extending root located in the blade-receiver channel and an airfoil that extends radially away from the root, the root having a first engagement face engaged with the first-disk segment and a second engagement face spaced apart axially from the first engagement face and engaged with the second-disk segment to interlock the blade with the disk, and the first and second engagement surfaces extend radially and axially from the airfoil to block the blade from tilting in the blade-receiver channel relative to the disk, and
a platform system that includes a platform arranged partway around the airfoil of the blade and engaged with the root of the blade to block circumferential movement of the blade in the blade-receiver channel relative to the axis and a pin that extends axially into the platform and into the disk to couple the platform with the disk for rotation with the disk, wherein the platform and the pin are separate components from the blade,
wherein the first-disk segment is formed to include a first blind hole that opens into the blade-receiver channel, the second-disk segment is formed to include a second blind hole that opens into the blade-receiver channel, and the pin extends into the first blind hole, through the platform, and into the second blind hole.

16. The wheel assembly of claim 15, wherein the first and second engagement surfaces of the root form a dovetail-shape when viewed circumferentially relative to the axis that is engaged by the fore-disk segment and the aft-disk segment.

17. The wheel assembly of claim 15, wherein the platform includes an outer radial wall arranged partway around the blade to define the boundary of a flow path of the gases and a rib that extends radially inward from the outer radial wall, wherein the rib is located in the blade-receiver channel of the multi-piece disk and engages the root of the blade.

18. The wheel assembly of claim 17, wherein the first pin that extends axially into the rib of the platform.

19. The wheel assembly of claim 17, wherein the rib of the platform is dovetail-shaped when viewed circumferentially relative to the axis.

20. A method comprising:
providing a multi-piece disk having a first-disk segment and a second-disk segment, a blade that includes a root and an airfoil that extends radially away from the root relative to an axis, the root being dovetail-shaped when viewed circumferentially relative to the axis, and a platform system that includes a platform and a pin that are separate components from the blade,
locating the root of the blade in a circumferentially extending passage formed in the first-disk segment,
positioning the platform adjacent the first-disk segment so that the platform is engaged with the root of the blade,
inserting the pin through the platform and into a first blind hole formed in the first-disk segment to couple the platform with the first-disk segment for movement therewith,
moving the second-disk segment relative to the first-disk segment to locate the root of the blade in a circumferentially extending passage formed in the second-disk segment and block radial and axial movement of the root in the circumferentially extending passage relative to the first-disk segment and the second-disk segment,
inserting the pin into a second blind hole formed in the second-disk segment, and
blocking relative movement between the first-disk segment and the second-disk segment.

* * * * *